US006633938B1

(12) United States Patent
Rowlands et al.

(10) Patent No.: US 6,633,938 B1
(45) Date of Patent: Oct. 14, 2003

(54) INDEPENDENT RESET OF ARBITERS AND AGENTS TO ALLOW FOR DELAYED AGENT RESET

(75) Inventors: Joseph B. Rowlands, Santa Clara, CA (US); David L. Anderson, Santa Clara, CA (US); James Y. Cho, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 433 days.

(21) Appl. No.: 09/680,525

(22) Filed: Oct. 6, 2000

(51) Int. Cl.[7] ............................................... G06F 12/00
(52) U.S. Cl. ....................... 710/240; 710/200; 710/241; 710/242; 710/243; 710/244
(58) Field of Search .................................. 710/200, 220, 710/241, 242, 243, 244, 240

(56) References Cited

U.S. PATENT DOCUMENTS

| | | | | |
|---|---|---|---|---|
| 4,257,095 A | * | 3/1981 | Nadir ........................... | 710/119 |
| 5,045,997 A | * | 9/1991 | Watanabe ..................... | 710/119 |
| 5,710,891 A | * | 1/1998 | Normoyle et al. ........... | 710/242 |
| 6,038,624 A | * | 3/2000 | Chan et al. ................... | 710/302 |

OTHER PUBLICATIONS

Halfhill, "SiByte Reveals 64–Bit Core for NPUs," Microprocessor Report, Jun. 2000, pp. 45–48.
*Pentium® Pro Family Developer's Manual, vol. 1: Specifications*, Chapter 4, pp. 1–18, 1996.

* cited by examiner

*Primary Examiner*—Tim Vo
(74) *Attorney, Agent, or Firm*—Lawrence J. Merkel; Meyertons, Hood, Kivlin, Kowert & Goetzel, P.C.

(57) ABSTRACT

A system includes two or more agents and a distributed arbitration scheme for the bus to which the agents are connected. Thus, an arbiter corresponding to each agent is provided. The arbiters are reset using a first reset signal, while the agents are reset using a separate reset signal or signals. The arbiters are concurrently released from reset when the first reset signal is deasserted, and may have a consistent reset state to provide for synchronization of the arbiters. The agents may be independently released from reset by the separate reset signals. Accordingly, the arbiters may be synchronized and may remain synchronized even if the corresponding agents are released from reset at different times, or are temporarily held in reset for any reason.

24 Claims, 4 Drawing Sheets

INDEPENDENT RESET OF ARBITERS AND AGENTS TO ALLOW FOR DELAYED AGENT RESET

BACKGROUND OF THE INVENTION

1. Field of the Invention

This invention is related to the field of digital systems and, more particularly, to reset of digital systems including two or more arbiters for a bus.

2. Description of the Related Art

A bus is frequently used in digital systems to interconnect a variety of devices included in the digital system. Generally, one or more devices are connected to the bus, and use the bus to communicate with other devices connected to the bus. As used herein, the term "agent" refers to a device which is capable of communicating on the bus. The agent may be a requesting agent if the agent is capable of initiating transactions on the bus and may be a responding agent if the agent is capable of responding to a transaction initiated by a requesting agent. A given agent may be capable of being both a requesting agent and a responding agent. Additionally, a "transaction" is a communication on the bus. The transaction may include an address transfer and optionally a data transfer. Transactions may be read transactions (transfers of data from the responding agent to the requesting agent) and write transactions (transfers of data from the requesting agent to the responding agent). Transactions may further include various coherency commands which may or may not involve a transfer of data.

The bus is a shared resource among the agents, and thus a mechanism for determining which agent is permitted to use the bus at any given time is needed. Generally, determining which of several agents is permitted to use the bus (often referred to as "mastering the bus") is referred to as "arbitration". An agent desiring to use the bus may signal its request to use the bus, referred to as "arbitrating". The circuitry for performing arbitration is referred to as an "arbiter". One or more agents may arbitrate for the bus, and the arbiter determines which of the arbitrating agents is permitted to use the bus. The agent granted use of the bus by the arbiter is referred to as the winner of the arbitration.

Arbitration may be centralized or distributed. In centralized arbitration, all arbitration requests are sent to a central arbiter which provides a grant to one of the agents. In distributed arbitration, each agent includes an arbiter which receives arbitration requests and determines the winner of the arbitration. If the agent corresponding to the arbiter is the winner, the arbiter informs the agent that it has won and that agent uses the bus. Distributed arbitration may reduce the time required from request to grant as compared to centralized arbitration, since the grant may be transmitted to the winning agent locally from the distributed arbiter at the winning agent.

In a distributed arbitration scheme, the distributed arbiters must remain synchronized with each other unless fixed priority is the arbitration policy. If synchronization is not maintained, two or more of the arbiters may signal a grant to their respective agents for the same arbitration. The agents would then simultaneously attempt to perform transactions on the bus. Such a situation is erroneous, and would lead to unpredictable results.

Additionally, it may be desirable to temporarily delay or disable access by one or more agents to the bus. For example, it may be desirable in a multiprocessing system (in which two or more processors are connected to a bus) for one of the processors to be permitted access to the bus while other processors are not permitted access. This may be useful during boot of the system, to allow the processor permitted access to read boot code from a boot read-only memory (ROM) while the other processors are held off.

Even though the agents are temporarily delayed, the arbiters corresponding to the delayed agents must remain synchronized with the other arbiters. Thus, when the agents. are subsequently permitted to use the bus, the arbiters corresponding to the agents may participate correctly in the distributed arbitration scheme.

SUMMARY OF THE INVENTION

The problems outlined above are in large part solved by a system as described herein. The system includes two or more agents and a distributed arbitration scheme for the bus to which the agents are connected. Thus, an arbiter corresponding to each agent is provided. The arbiters are reset using a first reset signal, while the agents are reset using a separate reset signal or signals. The arbiters are concurrently released from reset when the first reset signal is deasserted, and may have a consistent reset state to provide for synchronization of the arbiters. The agents may be independently released from reset by the separate reset signals. Accordingly, the arbiters may be synchronized and may remain synchronized even if the corresponding agents are released from reset at different times, or are temporarily held in reset for any reason. When the corresponding agents are released from reset and arbitrate, the arbiters are synchronized and arbitration may operate properly.

Providing for holding one or more agents in reset while other agents and the arbiters are operating may have a variety of uses. For example, in a multiprocessor system, one of the processors may be released from reset while the remaining processors are held in reset. The released processor may, for example, read its boot code from a boot ROM before the other processors and/or perform system initialization before the remaining processors are released. As another example, debug and testing may be simplified by allowing agents not involved in the test to be disabled. Furthermore, a defective agent may be isolated by being held in reset while other agents operate normally.

Broadly speaking, a system is contemplated. The system comprises a reset control circuit, a first agent and a second agent, and a first arbiter and a second arbiter. The reset control circuit is configured to generate a first reset signal and a second reset signal different from the first reset signal. The first agent is coupled to receive the first reset signal and configured to reset in response to an assertion of the first reset signal. The first arbiter is configured to determine if the first agent wins an arbitration for a bus, and is coupled to receive the second reset signal. The first arbiter is configured to reset in response to an assertion of the second reset signal. Coupled to receive the second reset signal and configured to reset in response to the assertion of the second reset signal, the second arbiter is configured to determine if the second agent wins an arbitration for the bus.

Additionally, in a system including (i) a first agent; (ii) a first arbiter configured to determine if the first agent wins an arbitration for a bus; (iii) a second agent; and (iv) a second arbiter configured to determine if the second agent wins an arbitration for the bus, a method is contemplated. The first agent and the second agent are reset; and the first arbiter and the second arbiter are independently reset.

BRIEF DESCRIPTION OF THE DRAWINGS

Other objects and advantages of the invention will become apparent upon reading the following detailed description and upon reference to the accompanying drawings in which.

Figure 1:
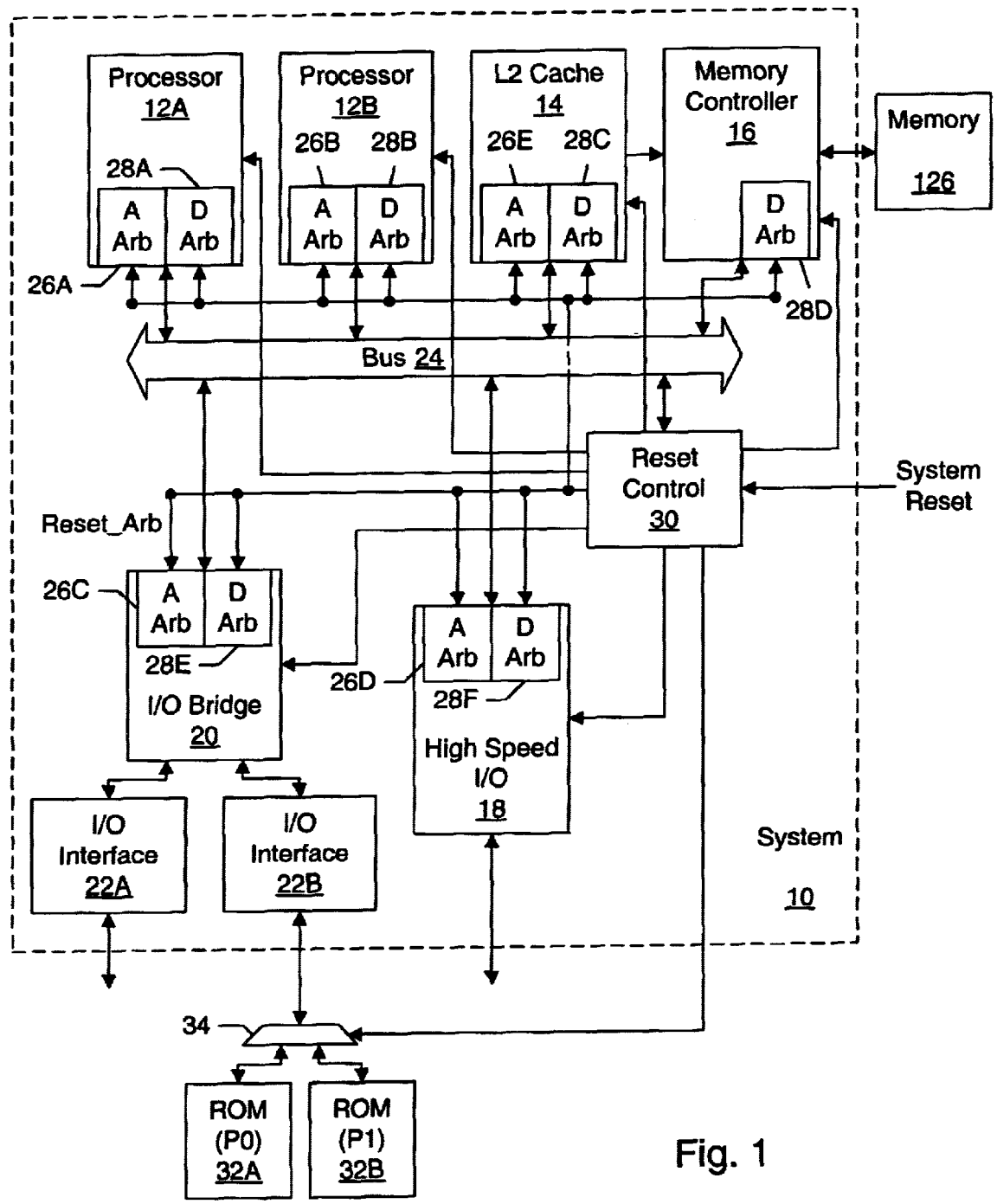
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a system 10 is shown. Other embodiments are possible and contemplated. In the embodiment of FIG. 1, system 10 includes processors 12A–12B, an L2 cache 14, a memory controller 16, a high speed input/output (I/O) bridge 18, an I/O bridge 20, I/O interfaces 22A–22B, and a reset control circuit 30. System 10 may include a bus 24 for interconnecting the various components of system 10. As illustrated in FIG. 1, each of processors 12A–12B, L2 cache 14, memory controller 16, high speed I/O bridge 18, I/O bridge 20, and reset control circuit 30 are coupled to bus 24. Each of processors 12A–12B, L2 cache 14, high speed I/O bridge 18, and I/O bridge 20 include an address bus arbiter (A Arb) labeled with reference numerals 26A–26E as illustrated in FIG. 1. Each of processors 12A–12B, L2 cache 14, memory controller 16, high speed I/O bridge 18, and I/O bridge 20 include a data bus arbiter (D Arb) labeled with reference numerals 28A–28F as illustrated in FIG. 1. I/O bridge 20 is coupled to I/O interfaces 22A–22B. L2 cache 14 is coupled to memory controller 16, which is further coupled to a memory 126. Reset control circuit 30 is coupled to receive a system reset signal and is coupled to provide reset signals to other components of system 10. More specifically, reset control circuit 30 provides a reset signal (Reset_Arb) to the arbiters 26A–26E and 28A–28F. Additionally, reset control circuit 30 provides reset signals separate from the Reset_Arb signal to processors 12A–12B, L2 cache 14, memory controller 16, I/O bridge 20, and high speed I/O bridge 18. Reset control circuit 30 may further provide reset signals for other circuitry (e.g. I/O interfaces 22A–22B), as desired. In the illustrated embodiment, I/O interface 22B may include circuitry for interfacing to one or more ROMs 32A–32B, coupled to provide data to I/O interface 22B through a multiplexor (mux) 34. Each of processors 12A–12B, L2cache 14, memory controller 16, I/O bridge 20, and high speed I/O bridge 18 may be an agent on bus 24 for the illustrated embodiment.

Generally, reset control circuit 30 is configured to generate a reset signal for the arbiters within system 10 and to generate a different reset signal or signals to the agents corresponding to those arbiters. Accordingly, the arbiters may be reset independently of the agents to which those arbiters correspond. In the illustrated embodiment, a single reset signal (Reset_Arb) is provided to all the arbiters. Thus, the arbiters are reset concurrently, and are also released from reset concurrently. Each arbiter may establish a reset state in response to the Reset_Arb signal, and that reset state is consistent with the reset state of the other arbiters, so that only one arbitration winner will be determined each arbitration. For example, the reset state may be that the priority of the agents in the arbitration is arranged in order of their agent identifier numbers (e.g. agent 0 is highest priority, agent 1 is next highest, etc.) Since the arbiters are released from reset concurrently, they are synchronized.

Additionally, since separate reset signals from the Reset_Arb signal are provided to the agents, the arbiters may be released from reset while one or more of the agents are held in reset. While an agent is held in reset, it is not operating and thus may not access the bus 24. However, the arbiter for that agent is operating (since it is unaffected by the agent's reset signal). Accordingly, if the agent is subsequently released from reset and arbitrates for the bus 24, that agent's arbiter is correctly synchronized with the other arbiters. Thus, that agent's arbiter may determine that that agent wins an arbitration that none of the other arbiters determine is won by their respective agents. Accordingly, proper arbitration operation is achievable.

Reset control circuit 30 generates the reset signals responsive to the system reset signal, and may also generate the reset signals responsive to an indication in a register within reset control circuit 30 (shown in FIG. 2 below). Reset control circuit 30 may be configured to assert each of the reset signals in response to the system reset signal. In one embodiment, reset control circuit 30 controls the length of the reset assertion to be at least a minimum period of time guaranteed to reset the receiving circuitry. Subsequent to the minimum period of reset assertion, reset control circuit 30 may deassert the reset signal to the arbiters (Reset_Arb) and may also deassert one or more of the reset signals to the agents. The arbiters and those agents for which reset is deasserted may begin operation, including arbitrating for bus 24.

Additionally, reset control circuit 30 may be configured to hold one or more agents in reset after the deassertion of the other reset signals. Since each agent receives a separate reset signal from reset control circuit 30 in the illustrated embodiment, reset control circuit 30 may hold any combination of agents in reset while other agents are released from reset. In one embodiment, the register within reset control circuit 30 may include indications for each agent which may be set to a state indicating that the agent is to be held in reset or to a state indicating that the agent is to be released from reset. The register may have a predefined state established in response to reset, and the state may be modified by executing instructions in a processor 12A–12B which update that register.

For example, reset control circuit 30 may be configured to hold processor 12B in reset while other agents and the arbiters (including arbiters 26B and 28B) are released from reset. Holding processor 12B in reset may allow processor 12A to read boot code from ROM 32A and then remap the boot addresses to correspond to ROM 32B for processor 12B to read its boot code. In this manner, processor 12A and processor 12B may read different code. In the illustrated example, the remapping of ROM addresses is provided via mux 34 on the output of the ROMs 32A–32B. Both ROMs may receive the same input address from I/O interface 22B. ROM 32A stores the code for processor 12A, and ROM 32B stores the code for processor 12B. Since processor 12B is held in reset after the arbiters and processor 12A are released from reset, reset control circuit 30 may initially select ROM 32A to output data (the instructions to be executed) to I/O interface 22B, which routes the data through I/O bridge 20 to bus 24. Processor 12A's code may include an instruction to remap the ROM addresses to ROM 32B (e.g. by updating a configuration register in reset control circuit 30 to change the selection control of mux 34 to select ROM 32B). Then, processor 12A's code may update the register storing the indication of processor 12B's reset status to release processor 12B. Processor 12B may then read its code from ROM 32B. It is noted that the register storing the selection control for mux 34 could be located anywhere within system 10 or external to system 10, as desired.

While FIG. 1 illustrates two separate ROM's for processor 12A and processor 12B, respectively, a single ROM could be used with different portions of the address range of the ROM used to store code for each of the processors 12A and 12B. Address decode circuitry could be signalled to determine which of the portions to read in response to boot addresses.

Furthermore, the boot code in the ROM could be programmed to determine which processor 12A–12B is executing the code (e.g. by reading a processor identification register or some similar resource) and branch to the appropriate code. However, holding processor 12B in reset while releasing processor 12A may still be desirable to allow processor 12A to initialize various system resources before processor 12B begins operating.

Generally, the ability to hold one or more agents in reset while allowing other agents to operate, and then to release the agents held in reset with the corresponding arbiters operating properly, may have a variety of uses. For example, during debugging and testing of system 10, it may be advantageous to hold one or more agents in reset while allowing others to operate. An agent having a defect (logical, manufacturing, or otherwise) could be held in reset while other agents are tested. Also, testing may be eased by holding in reset those agents not involved in the test.

It is noted that, while the same signal (Reset_Arb) is delivered to each arbiter in the illustrated embodiment, various embodiments may use multiple separate conductors to convey the signal to the arbiters. The use of multiple conductors may reduce the electrical loading on any one conductor, improving timing characteristics. However, the separate conductors may convey the same logical signal (e.g. the signals on each conductor may assert and deassert concurrently).

It is further noted that, while the illustrated embodiment provides separate reset signals to each agent to allow flexibility for which agents are held in reset and which agents are released from reset, other embodiments may consolidate reset signals and use a single reset signal for all agents which are to be held in reset and released from reset concurrently.

Bus 24 may be a split transaction bus in the illustrated embodiment. A split transaction bus splits the address and data portions of each transaction and allows the address portion (referred to as the address phase) and the data portion (referred to as the data phase) to proceed independently. In the illustrated embodiment, the address bus and data bus are independently arbitrated for, allowing for out of order data phases with respect to the corresponding address phases. Each transaction including both address and data thus includes an arbitration for the address bus, an address phase, an arbitration for the data bus, and a data phase. Additionally, coherent transactions may include a response phase for communicating coherency information after the address phase.

Accordingly, an address arbiter (A Arb) 26A–26E for arbitration for the address portion of the bus 24 is included in each agent in FIG. 1 which is capable of being a requesting agent. Similarly, a data arbiter (D Arb) 28A–28F for arbitration for the data portion of the bus 24 is included in each agent in FIG. 1 which is capable of being a responding agent. Each requesting agent is assigned an address request signal, and each responding agent is assigned a data request signal. More particularly, each agent is assigned an agent identifier and the corresponding address request signal and/or data request signal may be used by that agent. Additionally, the agent identifier may be driven by the agent as part of the corresponding address or data phase to identify that agent as the winner of the preceding arbitration.

The fairness scheme implemented by one embodiment of system 10 may be one in which the agent granted the bus is made lowest priority for being granted the bus again. The highest priority agent which is requesting the bus is granted the bus. Since address and data buses are separately arbitrated, separate priority states are maintained for the address and data buses.

Each address arbiter 26A–26E is coupled to receive at least the address request signals corresponding to each other requesting agent besides the requesting agent to which that address arbiter corresponds (the "corresponding agent"). In various embodiments the address arbiters may also receive the address request signal of the corresponding agent. For example, the corresponding agent of address arbiter 26A is processor 12A and address arbiter 26A receives the address request signals from each other agent (including the address request signals from processor 12B, L2 cache 14, I/O bridge 20, and high speed I/O bridge 18). The address arbiter tracks which of the agents are higher priority than the corresponding agent and which agents are lower priority than the corresponding agent for address bus arbitration. Thus, given the request signals from each other agent, the address arbiter can determine whether or not the corresponding agent wins the arbitration for the address bus. This determination may be relatively quick, and thus arbitration may be performed rapidly. Rather than attempt to calculate which other agent did win the arbitration, the address arbiter uses the agent identifier in the address phase of the transaction performed by the arbitration winner to update the priority state for the corresponding agent. More particularly, the agent which won the arbitration is marked as lower priority than the corresponding agent. On the other hand, if the corresponding agent does win the arbitration, the address arbiter updates the priority state to indicate that each other agent is higher priority than the corresponding agent.

Each data arbiter 28A–28F is similarly coupled to receive at least the data request signals corresponding to each other responding agent besides the responding agent to which that data arbiter corresponds. In various embodiments, the arbiters may further be coupled to receive the data request signal of the corresponding agent as well. The data arbiter tracks which of the agents are higher priority than the corresponding agent and which agents are lower priority than the corresponding agent for data bus arbitration. Thus, given the request signals from each other agent, the data arbiter can determine whether or not the corresponding agent wins the arbitration for the data bus. This determination may be relatively quick, and thus arbitration may be performed rapidly. Rather than attempt to calculate which other agent did win the arbitration, the data arbiter uses the agent identifier in the data phase of the transaction performed by the arbitration winner to update the priority state for the corresponding agent. More particularly, the agent which won the arbitration is marked as lower priority than the corresponding agent. On the other hand, if the corresponding agent does win the arbitration, the data arbiter updates the priority state to indicate that each other agent is higher priority than the corresponding agent.

While the above discussion illustrates a particular embodiment of address arbiters and data arbiters implementing a particular arbitration scheme, any arbitration scheme may be employed as desired.

Bus 24 may employ any suitable signalling technique. For example, in one embodiment, bus 24 may employ differential signalling. For example, in one implementation, each signal within bus 24 may be a differential pair of signals for high speed signal transmission. Other embodiments may employ any other signalling technique (e.g. TTL, CMOS, GTL, HSTL, etc.).

Processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture.

L2 cache 14 is a high speed cache memory. L2 cache 14 is referred to as "L2" since processors 12A–12B may employ internal level 1 ("L1") caches. If L1 caches are not included in processors 12A–12B, L2 cache 14 may be an L1 cache. Furthermore, if multiple levels of caching are included in processors 12A–12B, L2 cache 14 may be a lower level cache than L2. L2 cache 14 may employ any organization, including direct mapped, set associative, and fully associative organizations. In one particular implementation, L2 cache 14 may be a 512 kilobyte, 4 way set associative cache having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that entry. The stored tags are compared to the corresponding tag portion of the address of a memory transaction to determine if the memory transaction hits or misses in the cache, and is used to select the way in which the hit is detected (if a hit is detected).

Memory controller 16 is configured to access memory 126 in response to memory transactions received on bus 24. Memory controller 16 receives a hit signal from L2 cache 14, and if a hit is detected in L2 cache 14 for a memory transaction, memory controller 16 does not respond to that memory transaction. If a miss is detected by L2cache 14, or the memory transaction is non-cacheable, memory controller 16 may access memory 126 to perform the read or write operation. Memory controller 16 may be designed to access any of a variety of types of memory. For example, memory controller 16 may be designed for synchronous dynamic random access memory (SDRAM), and more particularly double data rate (DDR) SDRAM. Alternatively, memory controller 16 may be designed for DRAM, Rambus DRAM (RDRAM), SRAM, or any other suitable memory device.

High speed I/O bridge 18 may be an interface to a high speed I/O interconnect. For example, high speed I/O bridge 18 may implement the Lightning Data Transport (LDT) I/O fabric developed by Advanced Micro Devices, Inc. Other high speed interfaces may be alternatively used.

I/O bridge 20 is used to link one or more I/O interfaces (e.g. I/O interfaces 22A–22B) to bus 24. I/O bridge 20 may serve to reduce the electrical loading on bus 24 if more than one I/O interface 22A–22B is bridged by I/O bridge 20. Generally, I/O bridge 20 performs transactions on bus 24 on behalf of I/O interfaces 22A–22B and relays transactions targeted at an I/O interface 22A–22B from bus 24 to that I/O interface 22A–22B. I/O interfaces 22A–22B may be lower bandwidth, higher latency interfaces. For example, I/O interfaces 22A–22B may include one or more serial interfaces, Personal Computer Memory Card International Association (PCMCIA) interfaces, Ethernet interfaces (e.g. media access control level interfaces), Peripheral Component Interconnect (PCI) interfaces, etc.

It is noted that system 10 (and more particularly processors 12A–12B, L2 cache 14, memory controller 16, I/O interfaces 22A–22B, I/O bridge 20, I/O bridge 18 and bus 24 may be integrated onto a single integrated circuit as a system on a chip configuration. In another configuration, memory 126 may be integrated as well. Alternatively, one or more of the components may be implemented as separate integrated circuits, or all components may be separate integrated circuits, as desired. Any level of integration may be used.

As used herein, a transaction "targets" a location or device if the location or device is the provider of data for the transaction (for a read transaction) or receiver of data for the transaction (for a write transaction). Viewed in another way, a transaction may target a location or device if the address of the transaction is mapped to that location or device.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated.

The above discussion refers to the assertion and deassertion of a reset signal. As used herein, a reset signal is "asserted" if the state of the reset signal indicates that reset is to be performed. The reset signal is "deasserted" if the state of the reset signal indicates that reset is not to be performed. The reset signal may be asserted when it is in a logically high or logically low state, as desired, and may be deasserted in the opposite state. Furthermore, a circuit is "reset" if it is forced into a predetermined initial state from which predictable operation may occur based on the inputs to that circuit and its predetermined initial state. A circuit is "held in reset" if the reset signal to that circuit remains asserted after the minimum period of time used to establish the predetermined state. A circuit that is held in reset may remain in the predetermined state and may not begin operation. A circuit is "released from reset" when the reset signal to that circuit is deasserted. The circuit may begin operation from its predetermined initial state.

Figure 2:
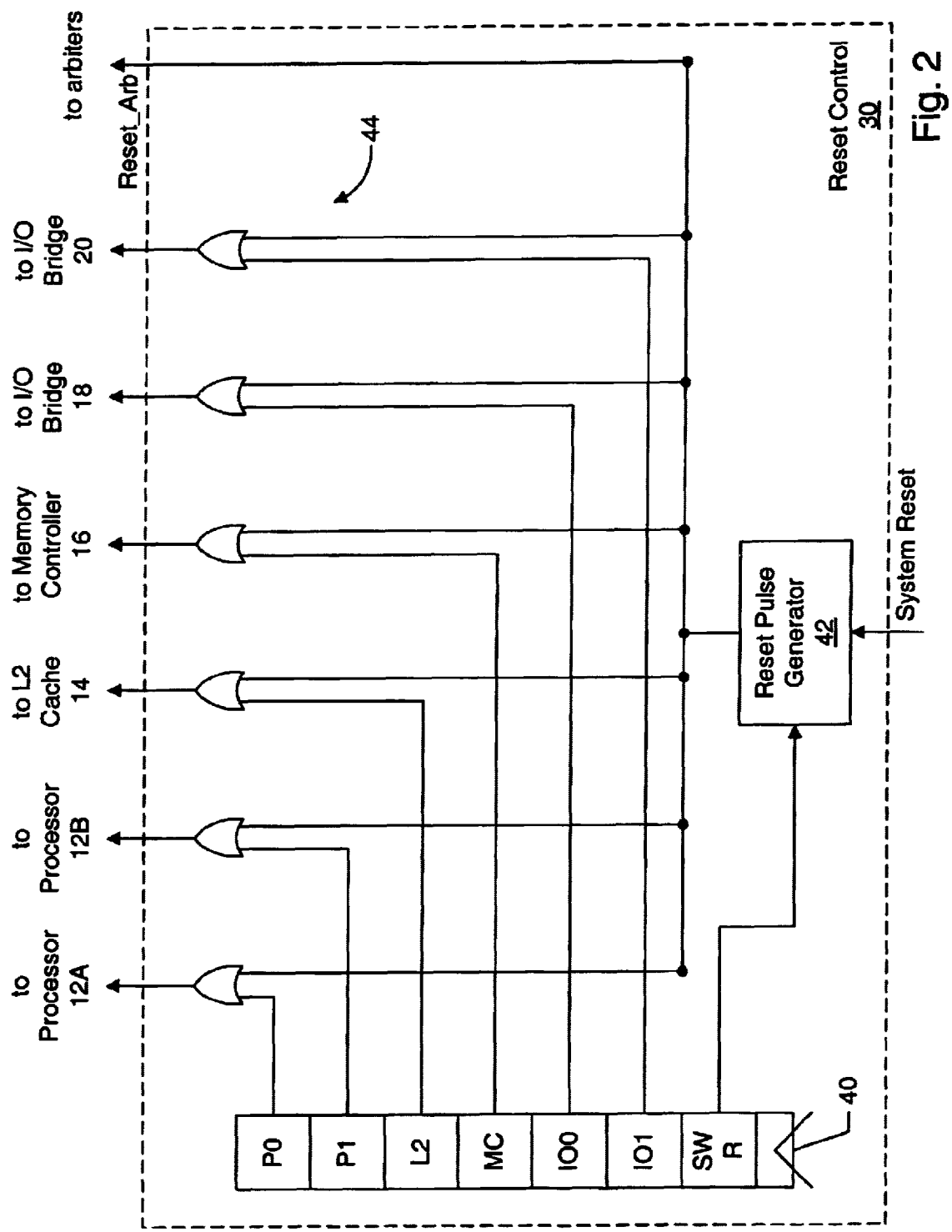
FIG. 2 is a block diagram of one embodiment of a reset control circuit shown in FIG. 1.

Turning now to FIG. 2, a block diagram of a portion of one embodiment of reset control circuit 30 is shown. Other embodiments are possible and contemplated. In the illustrated embodiment, reset control circuit 30 includes a reset control register 40, a reset pulse generator circuit 42, and an agent reset circuit 44. Reset pulse generator circuit 42 is coupled to receive the system reset signal. Reset pulse generator circuit 42 is further coupled to reset control register 40 and agent reset circuit 44. Reset pulse generator circuit 42 is coupled to the Reset_Arb signal, and agent reset circuit 44 is coupled to provide the reset signals to each agent.

Generally, in response to a system reset signalled on the system reset signal or a software initiated reset via a software reset (SWR) indication in reset control register 40, reset pulse generator 42 generates a reset pulse of at least the minimum width required to reset the agents and arbiters in system 10. More particularly, the reset pulse is an assertion of the reset signals for at least the minimum period of time to reset the agents and arbiters, followed by a deassertion of the reset. The reset pulse may be provided directly as the Reset_Arb signal to the arbiter circuits, and may be provided to agent reset circuit 44. Agent reset circuit 44 may assert each of its output reset signals to the agents for at least the duration of the reset pulse, and may continue assertion of the reset signals to one or more agents responsive to corresponding indications in reset control register 40. Thus, in the illustrated embodiment, agent reset circuit 44 may include an OR gate for each reset signal, ORing the reset pulse from reset pulse generator circuit 42 with the corresponding indication from reset control register 40.

Reset control register 40 may be used by software (e.g. code sequences executing in processor 12A and/or 12B) to control which agents are held in or released from reset. Reset control register 40 may be memory mapped to an address which may be read and/or written by instructions executing on the processors to determine the contents of reset control register 40 and to update the contents therein. In the illustrated embodiment, reset control register 40 includes an indication for each agent on bus 24. The indication may have at least two states: one indicating that the corresponding agent is to be held in reset and one indicating that the corresponding agent is to be released from reset. Thus, the indication may be a bit, for example, with the set state of the bit indicating that the agent should be held in reset and the clear state indicating that the agent should be released from reset. Similarly, the SWR indication may be a bit indicating, when set, that a system reset is being initiated by software and indicating, when clear, that the reset is not being initiated. Other embodiments may use the opposite sense of the set and clear states or may use other encodings.

Reset control register 40 may have a reset state established in response to a system reset (either initiated via the SWR indication or the system reset signal). More particularly, in one embodiment, bits P0 (corresponding to processor 12A), L2 (corresponding to L2 cache 14), MC (corresponding to memory controller 16), IO0 (corresponding to I/O bridge 18), and IO1 (corresponding to I/O bridge 20) may reset to a clear state (the "release from reset" state in the present example). Bit P1 (corresponding to processor 12B) may reset to the set state (the "hold in reset" state in the present example), causing processor 12B to be held in reset until an instruction executed by processor 12A clears the P1 bit. Other embodiments may have reset states in which other indications are reset to the set ("hold in reset") state, as desired.

Thus, after a system reset, the arbiters and all agents not indicated as held in reset may be released from reset and may begin operation. As desired by software, the agents that are held in reset may be released via updates to reset control register 40. Furthermore, agents which are released from reset but which software desired to deactivate may be deactivated by setting the corresponding bit in reset control register 40. The reset signal corresponding to that agent would then be asserted and the agent would be held in reset until subsequently released by clearing the bit or causing a system reset.

It is noted that, if both processors 12A and 12B were indicated as being held in reset via the bits P0 and P1 in reset control register 40, system 10 may lockup (from a software point of view) since there is not processor active to clear one of the bits P0 or P1. To prevent such a condition, one embodiment of reset control circuit 30 may treat the P0 bit somewhat differently than the other bits. If the P0 bit is set, a reset pulse of at least the required width may be sent to processor 12A but then the P0 bit may be automatically cleared by reset control circuit 30, allowing processor 12A to be released from reset.

It is noted that various agents may require result pulses of different widths. Reset pulse generator circuit 42 may be configured to provide different reset pulses for different agents, as desired. Alternatively, reset pulse generator circuit 42 may be configured to generate a reset pulse having a duration at least as long as the longest required reset duration. Still further, reset pulse generator 42 may be configured to generate a separate result pulse for the arbiters than is generated for the agents. The arbiters reset pulse may be terminated (causing the Reset_Arb signal to deassert) prior to or coincident with the deassertion of reset of the agents.

It is noted that, while agent reset circuit 44 is illustrated with specific logic gates in FIG. 2, any suitable circuitry may be used. Particularly, any Boolean equivalents to the circuitry illustrated in FIG. 2 may be used.

Figure 3:
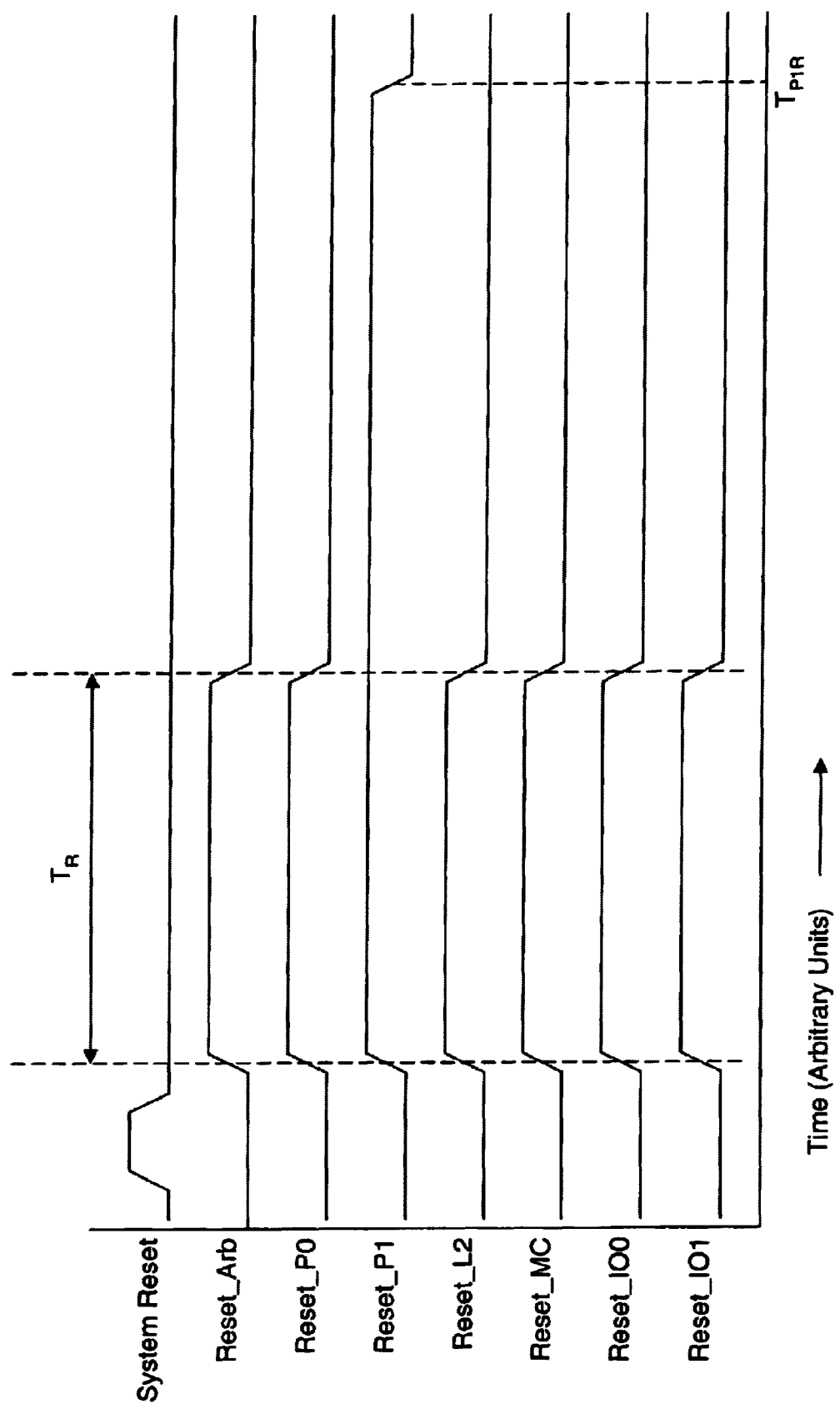
FIG. 3 is a timing diagram illustrating various reset signals for the circuits shown in FIGS. 1 and 2.

Turning next to FIG. 3, a timing diagram is shown illustrating operation of one embodiment of reset control circuit 30 for a system reset. Other embodiments are possible and contemplated. In the illustrated embodiment, the system reset and Reset_Arb signals are shown, as well as reset signals to each agent. The reset signals to the other agents are suffixed with a label similar to the labels used in reset control register 40. Thus, Reset_P0 is provided to processor 12A, Reset_P1 is provided to processor 12B, Reset_L2 is provided to L2 cache 14, Reset_MC is provided to memory controller 16, Reset_IO0 is provided to I/O bridge 18, and Reset_IO1 is provided to I/O bridge 20. Time is the horizontal axis of the timing diagram (in arbitrary units).

The system reset is signalled in FIG. 3 via assertion of the system reset signal. Reset pulse generator circuit 42 detects the system reset signal assertion, and generates a reset pulse. Thus, each of the reset signals Reset_Arb, Reset_P0, Reset_P1, Reset_L2, Reset_MC, Reset_IO0, and Reset_IO1 is asserted for the duration of the reset pulse (illustrated as $T_R$ in FIG. 3).

Once the result pulse is terminated, each of the reset signals shown in FIG. 3 deasserts except for the Reset_P1 signal. As discussed above, processor 12B may remain held in reset until processor 12A updates the reset control register 40 to indicate releasing processor 12B from reset. At a time $T_{PIR}$ illustrated in FIG. 3, reset control register 40 is updated and Reset_P1 deasserts.

As mentioned above, different result pulse durations may be provided to different agents, and the duration of the reset pulse to the arbiters may be less than the duration of the reset pulse to any of the agents, as desired.

Figure 4:
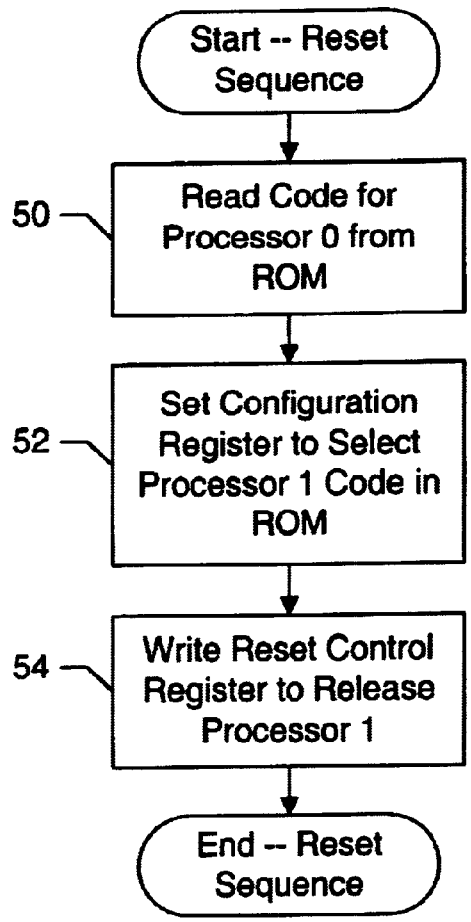
FIG. 4 is a flowchart illustrating exemplary code which may be executed by one embodiment of a processor shown in FIG. 1.

Turning now to FIG. 4, a flowchart is showing illustrating an exemplary code sequence that may be executed by processor 12A after being released from reset. The code may be located at the reset vector from which processor 12A fetches code after being released from reset. These addresses may be mapped, e.g., to ROM 32A shown in FIG. 1 for the embodiment of FIG. 1. Other embodiments are possible and contemplated.

Processor 12A may read the code to be executed by processor 12A from ROM 32A (block 50) and may store the code in memory. The code may include the code that processor 12A will execute during normal operation. The code may also include, for example, code to initialize various system resources.

Processor 12A, subsequent to reading the code and executing any system initialization code, may then set the configuration register which selects the code for processor 12B in the ROM for fetching in response to reset vector addresses (block 52). Block 52 may be eliminated in embodiments which use a read of a processor identification register and branch in the code to distinguish between the processors. Finally, processor 12A may update reset control register 40 to release processor 12B from reset (block 54).

Figure 5:
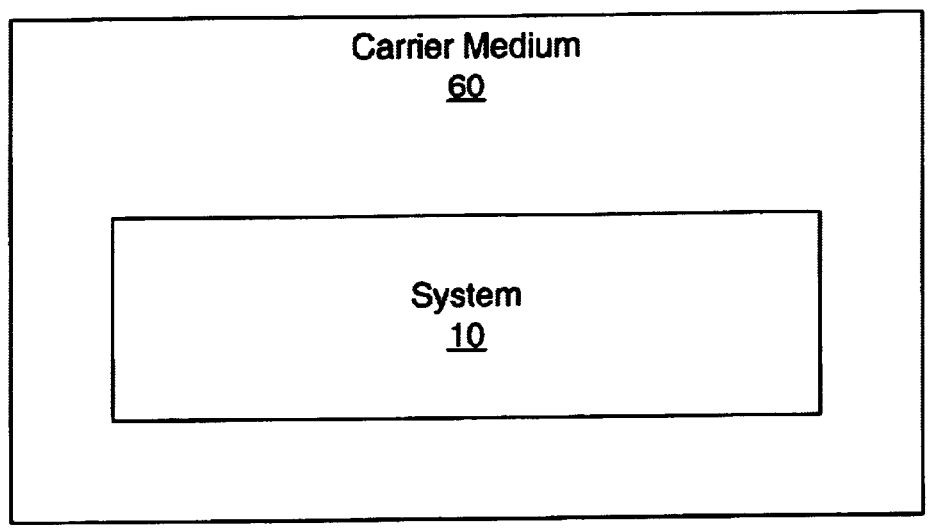
FIG. 5 is a block diagram of a carrier medium.

Turning next to FIG. 5, a block diagram of a carrier medium 60 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of system 10 carried on carrier medium 60 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates in a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 60 may be the netlist (with or without the synthesis library) or the data set, as desired.

While carrier medium 60 carries a representation of system 10, other embodiments may carry a representation of any portion of system 10, as desired, including arbiters, agents, reset control circuits, etc.

Numerous variations and modifications will become apparent to those skilled in the art once the above disclosure is fully appreciated. It is intended that the following claims be interpreted to embrace all such variations and modifications.

What is claimed is:

1. A system comprising:
   a reset control circuit configured to generate a first reset signal, a second reset signal different from said first reset signal, and a third reset signal different from said first reset signal and said second reset signal, wherein said reset control circuit is configured to transmit said first reset signal, said second reset signal, and said third reset signal in parallel;
   a first agent coupled to receive said first reset signal and configured to reset in response to an assertion of said first reset signal;
   a first arbiter configured to determine if said first agent wins an arbitration for a bus, wherein said first arbiter is coupled to receive said second reset signal and is configured to reset in response to an assertion of said second reset signal;
   a second agent coupled to receive said third reset signal, and wherein said second agent is configured to reset in response to an assertion of said third reset signal; and
   a second arbiter coupled to receive said second reset signal and configured to reset in response to said assertion of said second reset signal, wherein said second arbiter is configured to determine if said second agent wins an arbitration for said bus.

2. The system as recited in claim 1 wherein said reset control circuit is configured to deassert said first reset signal prior to deasserting said third reset signal.

3. The system as recited in claim 1 wherein said reset control circuit comprises a register, wherein said register is configured to store a system reset indication, and wherein said reset control circuit is configured to assert said first reset signal, said second reset signal, and said third reset signal responsive to said system reset indication indicating that said system is to be reset.

4. The system as recited in claim 1 wherein said reset control circuit is coupled to receive a system reset signal, and wherein said reset control circuit is configured to assert said first reset signal, said second reset signal, and said third reset signal responsive to said system reset signal indicating that said system is to be reset.

5. The system as recited in claim 1 wherein said reset control circuit is configured to deassert said second reset signal prior to or coincident with deasserting said first reset signal.

6. The system as recited in claim 1 wherein said first arbiter comprises an address arbiter corresponding to an address portion of said bus, and wherein said second arbiter comprises an address arbiter corresponding to an address portion of said bus.

7. The system as recited in claim 1 wherein said first arbiter comprises a data arbiter corresponding to a data portion of said bus, and wherein said second arbiter comprises a data arbiter corresponding to a data portion of said bus.

8. The system as recited in claim 1 further comprising a plurality of agents including said first agent and said second agent and still further comprising a plurality of arbiters including said first arbiter and said second arbiter, each of said plurality of arbiters coupled to receive said second reset signal and configured to reset in response to said second reset signal, and each of said plurality of agents coupled to receive a different one of a plurality of reset signals including said first reset signal and said third reset signal, and wherein said plurality of agents are configured to reset in response to said one of said plurality of reset signals.

9. The system as recited in claim 1 wherein said reset control circuit, said first agent, said first arbiter, said second agent, and said second arbiter are integrated onto a single chip.

10. The system as recited in claim 2 wherein said reset control circuit comprises a register, wherein said register is configured to store an indication corresponding to said second agent, and wherein said indication is indicative of whether said second agent is to be held in reset or released from reset, and wherein said reset control circuit is configured to deassert said reset signal responsive to said indication being indicative that said second agent is to be released from reset.

11. The system as recited in claim 10 wherein said first agent comprises a processor, and wherein said processor is configured to execute an instruction to update said indication in said register to indicate that said second agent is to be released from reset.

12. The system as recited in claim 11 wherein said second agent comprises a second processor.

13. A carrier medium comprising a database which is operated upon by a program executable on a computer system, the program operating on the database to perform a portion of a process to fabricate an integrated circuit including a system described by the database, the system described in the database including:

a reset control circuit configured to generate a first reset signal, a second reset signal different from said first reset signal, and a third reset signal different from said first reset signal and said second reset signal, wherein said reset control circuit is configured to transmit said first reset signal, said second reset signal, and said third reset signal in parallel;

a first agent coupled to receive said first reset signal and configured to reset in response to an assertion of said first reset signal;

a first arbiter configured to determine if said first agent wins an arbitration for a bus, wherein said first arbiter is coupled to receive said second reset signal and is configured to reset in response to an assertion of said second reset signal;

a second agent coupled to receive said third reset signal, and wherein said second agent is configured to reset in response to an assertion of said third reset signal; and a second arbiter coupled to receive said second reset signal and configured to reset in response to said assertion of said second reset signal, wherein said second arbiter is configured to determine if said second agent wins an arbitration for said bus.

14. The carrier medium as recited in claim 13 wherein said reset control circuit is configured to deassert said first reset signal prior to deasserting said third reset signal.

15. The carrier medium as recited in claim 13 wherein said reset control circuit comprises a register, wherein said register is configured to store a system reset indication, and wherein said reset control circuit is configured to assert said first reset signal, said second reset signal, and said third reset signal responsive to said system reset indication indicating that said system is to be reset.

16. The carrier medium as recited in claim 13 wherein said reset control circuit is coupled to receive a system reset signal, and wherein said reset control circuit is configured to assert said first reset signal, said second reset signal, and said third reset signal responsive to said system reset signal indicating that said system is to be reset.

17. The carrier medium as recited in claim 13 wherein said reset control circuit is configured to deassert said second reset signal prior to or coincident with deasserting said first reset signal.

18. The carrier medium as recited in claim 13 wherein said first arbiter comprises an address arbiter corresponding to an address portion of said bus, and wherein said second arbiter comprises an address arbiter corresponding to an address portion of said bus.

19. The carrier medium as recited in claim 13 wherein said first arbiter comprises a data arbiter corresponding to a data portion of said bus, and wherein said second arbiter comprises a data arbiter corresponding to a data portion of said bus.

20. The carrier medium as recited in claim 13 wherein the system further comprises a plurality of agents including said first agent and said second agent and still further comprises a plurality of arbiters including said first arbiter and said second arbiter, each of said plurality of arbiters coupled to receive said second reset signal and configured to reset in response to said second reset signal, and each of said plurality of agents coupled to receive a different one of a plurality of reset signals including said first reset signal and said third reset signal, and wherein said plurality of agents are configured to reset in response to said one of said plurality of reset signals.

21. The carrier medium as recited in claim 13 wherein said reset control circuit, said first agent, said first arbiter, said second agent, and said second arbiter are integrated onto a single chip.

22. The carrier medium as recited in claim 14 wherein said reset control circuit comprises a register, wherein said register is configured to store an indication corresponding to said second agent, and wherein said indication is indicative of whether said second agent is to be held in reset or released from reset, and wherein said reset control circuit is configured to deassert said reset signal responsive to said indication being indicative that said second agent is to be released from reset.

23. The carrier medium as recited in claim 22 wherein said first agent comprises a processor, and wherein said processor is configured to execute an instruction to update said indication in said register to indicate that said second agent is to be released from reset.

24. The carrier medium as recited in claim 23 wherein said second agent comprises a second processor.

* * * * *